US005909509A

United States Patent [19]
Chiang et al.

[11] Patent Number: 5,909,509
[45] Date of Patent: Jun. 1, 1999

[54] STATISTICAL-BASED RECOGNITION OF SIMILAR CHARACTERS

[75] Inventors: Cheng-Chin Chiang; Shiaw-Shian Yu, both of Hsinchu, Taiwan

[73] Assignee: Industrial Technology Research Inst., Taiwan, Taiwan

[21] Appl. No.: 08/643,293

[22] Filed: May 8, 1996

[51] Int. Cl.$^6$ .................................................. G06K 9/62
[52] U.S. Cl. ........................................ 382/228; 382/159
[58] Field of Search .................................. 382/224, 225, 382/226, 227, 228, 190, 159, 160, 161

[56] References Cited

U.S. PATENT DOCUMENTS

| | | | |
|---|---|---|---|
| 4,040,009 | 8/1977 | Kadota et al. | 382/227 |
| 4,573,196 | 2/1986 | Crane et al. | 382/185 |
| 4,718,102 | 1/1988 | Crane et al. | 382/185 |
| 5,005,205 | 4/1991 | Ellozy et al. | 382/187 |
| 5,077,809 | 12/1991 | Ghazizadeh | 382/217 |
| 5,285,505 | 2/1994 | Kim et al. | 382/161 |
| 5,379,349 | 1/1995 | Avi-Itzhak | 382/160 |
| 5,519,786 | 5/1996 | Courtney et al. | 382/159 |
| 5,673,337 | 9/1997 | Gallo et al. | 382/187 |
| 5,699,455 | 12/1997 | Arai et al. | 382/187 |

OTHER PUBLICATIONS

Jeong–Seon Park and Seong–Whan Lee, "*Adaptive Nonlinear Pattern Matching Method for Off–Line Recognition of Handwritten Characters,*" IWFHR (International Workshops On Frontiers in Handwriting Recognition) IV, pp. 165–175, 1994.

A.B. Wang, J.S. Huang, and K.C. Fan, "*Optical Recognition of Handwritten Chinese Characters by Modified Relaxation*", Proceeding of 1992 Second National Workshop on Character Recognition, pp. 115–158.

T.F. Li, S.S. Yu, H.F. Sun and S.L. Chou, "*Handwritten and Printed Chinese Character Recognition Using Bayes Rule*", Intelligent Systems for Processing Oriental Languages, pp. 406–411, 1992.

J.Z. Hu, "*Identification of Similar Characters in Handwriting and Printed Chinese Character Recognition*", Chinese Information Journal, Issue 1, vol. 9, pp. 37–41, 1995.

*Primary Examiner*—Jon Chang
*Attorney, Agent, or Firm*—Proskauer Rose LLP

[57] ABSTRACT

A character recognition device and system:

(1) constructs a database comprising pairs of similar-looking characters;
(2) selects critical features distinguishing these characters from each other; and
(3) performs a recognition process based on the selected critical features.

In the present invention, sample data is automatically analyzed to construct a feature reference database for a typical character recognition device. If two characters are confused for a threshold number of times, this pair is considered to be similar-looking or confusing. The reference data already accumulated is statistically analyzed for each similar-looking pair to determine the importance of certain features in distinguishing the two characters. These features are further statistically analyzed so that only the most dominant features will be looked at and the less dominant or similar-looking features will be ignored. A table is constructed containing a list of all similar-looking characters and the number of dominant, distinguishing features that are statistically likely to be present in order to select a top candidate character.

16 Claims, 8 Drawing Sheets

| | | | | | | | | | |
|---|---|---|---|---|---|---|---|---|---|
| 七七 | 大犬 | 冷沛 | 杞祀 | 抽柚 | 頁貞 | 校核 | 祖租 | 硯視 | 遊遨 |
| 七亡 | 己乙 | 冷汾 | 杆杵 | 東束 | 俳俳 | 校梭 | 祖袒 | 閔閔 | 置窘 |
| 九丸 | 己已 | 冷冷 | 杠扛 | 況汎 | 冊棚 | 浬浬 | 唱喝 | 閔閭 | 險除 |
| 九大 | 己巳 | 固囚 | 狂往 | 泊泊 | 狹戎 | 浬理 | 晝書 | 閔開 | 孥孥 |
| 九尤 | 已巳 | 佈佈 | 狂拄 | 門門 | 首首 | 烏爲 | 畫畫 | 墻搪 | 孥縈 |
| 九花 | 汗仟 | 秒炒 | 育盲 | 哂哂 | 倡侶 | 烏鳥 | 逞廷 | 塘瑭 | 簇筷 |
| 人入 | 汗汁 | 秒炒 | 東卓 | 洛浴 | 倡偈 | 膑肢 | 逞沼 | 塘糖 | 臍臏 |
| 人八 | 汗奸 | 束東 | 刺刺 | 科料 | 宮害 | 酒迪 | 逗追 | 賑賜 | 饒饞 |
| 也世 | 汗汗 | 束東 | 刺刺 | 宮害 | 校技 | 酒逸 | 逗浚 | 俊檢 | 櫟棷 |
| 土上 | 汗杵 | 李季 | 味咪 | 苦若 | 校抆 | 祖相 | 渡液 | 摩磨 | 親親 |

STATISTICAL-BASED RECOGNITION OF SIMILAR CHARACTERS

BACKGROUND OF THE INVENTION

1. Field of the Invention

The present invention is directed to character recognition and, more particularly, to improved statistical-based recognition of similar looking characters.

2. Description of Related Art

Character recognition is used in many ways. Two examples of character recognition applications include optical character recognition (OCR) and pen-based computing.

In OCR, forms containing printed and handwritten characters (such as alphanumeric characters, kana characters, kanji characters, or other types of characters) may be scanned by an optical (OCR) device. An OCR device typically shines a bright light onto a form. The light reflected back determines printed information. The location of this printed information is interpreted as recognizable characters, words, etc. The interpreted information becomes electronic text which may be displayed on a computer monitor, stored in an electronic memory, or otherwise processed as ordinary electronic text.

FIG. 1 is a block diagram of a typical OCR system 50, such as may be used with the present invention. This system 50 includes a paper transport system 51. The paper transport system 51 moves the forms in the direction of the arrow past an optical scanner ("OCR scanner") 52. A preferred embodiment of the OCR scanner 52 forms a digital image of a form by illuminating the form with a bright light such as a laser light and then recording the reflected light using storage devices such as CCDs. This type of scanner may be used to form a bitonal digital image wherein each pixel is either white or black, corresponding to logic "1" or logic "0". One such OCR scanner 52 is a model TDC2610W, manufactured by Terminal Data Corp.

The scanner 52 may be connected to a processor 54, such as a general purpose computer or a special purpose hardware processing element. The processor's hardware elements may be optical processing elements or electronic processing elements such as resistor summing networks and digital logic circuits. The processor may include a microprocessor 56 and other components; a screen or monitor 58; and a keyboard or other input device 60. The processor 54 may also include a memory device 62 for storing the scanned documents. This memory device may be, for example, a disk memory, a RAM, or other memory device. The character recognition is typically performed by the processor 54.

Pen-based computing may be used, for example, in Personal Digital Assistants (PDAs) and other pen-based computing devices. FIG. 2 illustrates a pen-based PDA 70. A PDA is a portable computer which may include applications for appointment calendars, an electronic address book, a pen-based memo pad, and may also provide wireless communications, such as faxing, e-mail, and paging. These devices may receive information handwritten on a screen 72 using a stylus 74 or other pen-like device. Known pen-based computers may, for example, include word-processing devices using a stylus for input rather than (or in addition to) a keyboard. The handwritten input 76 may be interpreted using character recognition techniques and converted into electronic form. The converted text may be displayed on the screen 72 (as seen in FIG. 2), stored in memory, transmitted as a digital message, such as a page, fax, or e-mail, or otherwise handled as any other electronic text. The character recognition is typically performed in a processor in the PDA 70.

One problem involved in character recognition is distinguishing between one or more characters that are similar in appearance. Although this problem arises with all character types, it is particularly acute in oriental languages. This is because oriental languages contain a large number of characters having complex structures, many of which are very similar in appearance. For example, the Republic of China's Department of Education has identified 5,401 commonly used Chinese characters, and some business and industrial applications may commonly use more than 13,000 characters. In contrast, an alphanumeric keyboard typically contains 68 characters including letters, numbers, punctuation marks, and mathematical characters. An additional 26 characters include the upper case letters, for a total of 94 characters. A Chinese character comprises a number of radicals; a radical comprises a number of strokes. Therefore, a Chinese character typically comprises many strokes. This structure is typically much more complex than alphanumeric characters and numerals.

Character recognition usually involves comparing an image to be interpreted with data relating to known characters. From this comparison, a number of candidate characters are selected from the data which most closely resemble the image to be interpreted. A number of characters are ranked according to the comparison. The present inventors tested a character recognition system proprietary to the assignee herein using Chinese characters and found that the correct recognition percentage differed the most when determining between the top two candidate characters.

When the top five candidates were requested, the system included the correct character 97.81% of the time. When the top two candidates were requested, the correct character was included 95.16% of the time. When the single top candidate was requested, however, the correct character was presented only 90.02% of the time. A chart comparing N (where N is the number of candidates listed) with the percentage of correctly recognized characters is set out below:

| Order of<br>First N Candidates | Pct. Correct<br>Recognition |
| --- | --- |
| N = 5 | 97.81% |
| N = 4 | 97.41% |
| N = 3 | 96.72% |
| N = 2 | 95.16% |
| N = 1 | 90.02% |

Note the drastic drop in recognition rate between N=1 and N=2.

This test illustrates that one problem with character recognition is determining between the top two candidate characters. One reason for this problem is that certain characters look very similar. As seen in FIG. 3, many Chinese characters appear very similar. FIG. 3 illustrates the Chinese characters for "self" 80, "already" 82, and "stop" 84. Other oriental languages, such as Japanese and Korean, also have very large character vocabularies containing similar-looking characters.

Incorrect character recognition may have several adverse effects on a character recognition system. If the interpreted character is not further processed after interpretation, the output will be incorrect. If the character is further processed after interpretation it may substantially slow the recognition process or result in an incorrect output. If a character is "word" or "grammar" checked, the character is checked to determine if it makes sense in the context of a full word, or a sentence or phrase, respectively. Using an alphanumeric example, an error in interpreting a character as a "c", but was really an "e", may be detected when a complete "word" is "thc", rather than "the". An error in interpreting a character as a "C", but was really an "E", may be detected in a grammar check when the resulting sentence is "Cat your dinner", instead of "Eat your dinner".

If a word check rejects the word, each character in the rejected word may be reviewed to determine which character was the likely cause of the error. When a likely cause of the error is determined, another candidate character is inserted and the word check is performed again. If a grammar check rejects a sentence, each word may be reviewed to determine the likely cause of the error. Once the probable erroneous word is located, each character may be reviewed to determine which character was the likely cause of the error in the word. When a likely cause of the error is determined, another candidate character is inserted and the word and grammar checks are performed again. Naturally, if the word having the next candidate character fails one of these checks, the process begins again. It is easy to see how incorrect character recognition may lead to significant delays in the character recognition process.

Several solutions to the problem of similar looking characters have been proposed. Many of these proposed solutions, however, are based on structural matching character recognition methods. Structural matching methods match features of the image to be interpreted with likely candidate characters. That is, characters are attempted to be distinguished by the presence or absence in the image of structural features such as strokes, dots, and radicals. Such structural matching solutions are disclosed, for example, by Jeong-Seon Park and Seong-Whan Lee "Adaptive Nonlinear Pattern Matching Method for Off-Line Recognition of Handwritten Characters," IWFHR (International Workshops On Frontiers in Handwriting Recognition) IV, pp. 165–75, 1994; and A. B. Wang, J. S. Huang, and K. C. Fan, "Optical Recognition of Handwritten Chinese Characters by Modified Relaxation", Proceeding of 1992 Second National Workshop on Character Recognition, pp. 115–58.

Although structural matching may, in some instances, provide precise discrimination between similar characters, it has several drawbacks. Two of these drawbacks are limitations in character recognition hardware, and another is the difficulty in generalizing structural differences between characters, particularly in oriental languages.

It is difficult for character recognition hardware to detect, or "extract", different features of images. The structure of characters, particularly Chinese and other oriental characters, are too complicated to be readily distinguished in this manner. Also, an optically scanned image may be distorted, damaged, or not fully detected (for example, a thin or lightly drawn line may not be detected) so that the entire structure of the character's image is not available for extraction and matching. This problem is exacerbated with handwritten characters because of the great variation in handwriting. Again using an alphanumeric example, not everyone dots his "i" or "j"; also, left-handed people may write characters in a different manner than right-handed people. Variations in handwriting may result in a lower correct recognition rate.

It is also difficult to generalize the structural differences between all sets of similar characters (one set of similar characters is shown in FIG. 3). Each set of similar-looking characters requires different structural features in order for the characters to be distinguished from one another. It may require substantial work and time to manually generalize the structural differences between similar-looking characters in order to establish a structural matching database.

In contrast to structural matching, some character recognition methods use statistics-based recognition methods. In a statistical character recognition system, an image is partitioned into a number of blocks; and a number of pixel-based features in each block are extracted. The extracted pixel-based features in each block are compared to previously obtained statistical information regarding possible characters. Candidate characters are selected according to how closely the number of features in each block statistically resemble the previously obtained information. It is simpler to "extract" scanned images using a statistical character recognition method. This method also lessens the errors caused by variations in handwriting. One such statistical character recognition system is described in T. F. Li, S. S. Yu, H. F. Sun, and S. L. Chou, "Handwritten and Printed Chinese Character Recognition Using Bayes Rule", Intelligent Systems for Processing Oriental Languages, pp. 406–11, 1992.

The problem of distinguishing similar looking characters has also been addressed using statistical methods, as well. Most of these proposed solutions define special features of the similar-looking characters. These special features do not apply to all sets of similar-looking characters, and therefore have only limited use. It has been proposed in J. Z. Hu, "Identification of Similar Characters in Handwriting and Printed Chinese Character Recognition", Chinese Information Journal, Issue 1, Vol. 9, pp. 37–41, 1995, to define different statistics for features of different characters. However, as with the structural methods, it may require substantial work and time to manually define the statistical data regarding differences between similar-looking characters in order to establish a statistical database. Moreover, the additional statistical data may use a significant amount of memory, making such a device unsuitable for applications where large memories are not available or are impractical. A PDA, for example, should be portable and reasonably priced, and may therefore have memory constraints; thus efficient memory use may be advantageous.

FIG. 4 is a block diagram illustrating a statistical character recognition device 90 having a separately compiled database of special features of similar looking characters. This device 90 may be found, for example, in the processor 54 of an OCR 50 or PDA 70. A device operating according to this method uses standard hardware well-known to those skilled in the relevant art.

A character is input into the character recognition device. The image may be an image of a printed or handwritten document scanned by an OCR (as seen in FIG. 1), an input on a screen of a pen-based computer (as seen in FIG. 2), or other image input. The image is presented to a feature extractor 92, where features of the image are "extracted". The image is scanned to determine the location of pixels.

Next, the extracted image is sent to a recognition engine 94 for recognition. The recognition engine 94 compares the extracted features of the image to statistical information regarding a set of characters contained in an original feature reference database 96. One or more candidate characters are selected based on this comparison.

A new feature definition database 100 stores statistical information regarding similar-looking characters. The database 100 is consulted to determine if a candidate character is one of the characters that is similar in appearance to other characters. If it is, the image is extracted by a similar character feature extractor 98, which looks at the scanned pixels in more detail.

Image features extracted by the similar character extractor 98 are presented to a similar character recognition module 102, which selects a top candidate character by referring to a new feature reference database 104. The new feature reference database 104 contains statistical information regarding differences between features of similar-looking characters. The top character candidate is output by the device for further processing by OCR 50 or PDA 70, such as word or grammar checking, or is stored, displayed, or otherwise used in any manner that other electronic data is stored, handled, or processed. Note that in addition to the ordinary character recognition device, three additional databases (original feature definition database 96, new feature definition database 100, and new feature reference database 104) are used to distinguish similar-looking characters. These databases use up valuable memory space.

It should be understood that the present invention may be used with any type of characters (alphanumeric, Cyrillic, Hebrew, Arabic, Greek, etc.). The invention, however, is particularly suitable for use with the unique challenges imposed by oriental languages. The invention therefore, is described with reference to Chinese characters.

It is an object of the present invention to improve character recognition rates by increasing the recognition between similar-looking characters.

It is another object of the present invention to provide a memory efficient and economical device for increasing the correct character recognition rate.

It is yet another object of the present invention to provide a statistical method for improving character recognition that relies on reference data already used by a character recognition device, thus not using any significant additional memory space.

SUMMARY OF THE INVENTION

These and other objects of the present invention are achieved by a character recognition device and system according to the present invention. The device according to the present invention:

(1) constructs a database comprising pairs of similar-looking characters;

(2) selects critical features distinguishing these characters from each other; and (3) performs a recognition process based on the selected critical features.

In one preferred embodiment of the present invention, sample data used by the statistical character recognition device is automatically analyzed to construct a feature reference database for a typical character recognition device. Using this sample data, the inventive device is set-up, or "trained", as follows. Test data on a vocabulary of characters is run. If two characters are erroneously confused with each other a threshold number of times, this pair is considered to be similar-looking. The reference data already accumulated is statistically analyzed for each similar looking pair to determine the importance of certain features in distinguishing the two characters. These features are further statistically analyzed so that only the most dominant features will be looked at and the less dominant or confusing features will be ignored. A table is constructed containing a list of all similar looking characters and the number of dominant, distinguishing features that are statistically likely to be present in order to select a top candidate character.

Once the device has been "trained", a preferred embodiment of the present invention may operate as follows. An image to be recognized is extracted. A conventional character recognition device selects and ranks candidate characters according to the extracted image's resemblance to statistics for known characters. If the first and second candidates are found within the table of similar-looking pairs, a similar character recognition device determines the statistical deviation of the extracted image from the two statistical features of the similar-looking characters. If the extracted image is closer to the second candidate, the two candidate characters are switched, so the character selected to be the top candidate by the standard character recognition process is replaced by the second candidate character as the top candidate. The characters may be further processed (i.e., word or grammar checked) according to the new ranking.

Similar-looking characters are preferably distinguished using the statistical data compiled for the conventional statistical character recognition device. The recognition may be made with the aid of a single table containing a list of similar-looking character pairs and a number of dominant, distinguishing features that distinguish one of the characters in the pair from the other. This table preferably uses only a small amount of memory space.

BRIEF DESCRIPTION OF THE DRAWINGS

These and other features of the present invention will be made apparent with reference to the following drawings:

FIG. 8 is a table of similar-looking Chinese language character pairs;

DETAILED DESCRIPTION OF PREFERRED EMBODIMENTS

Figure 5:
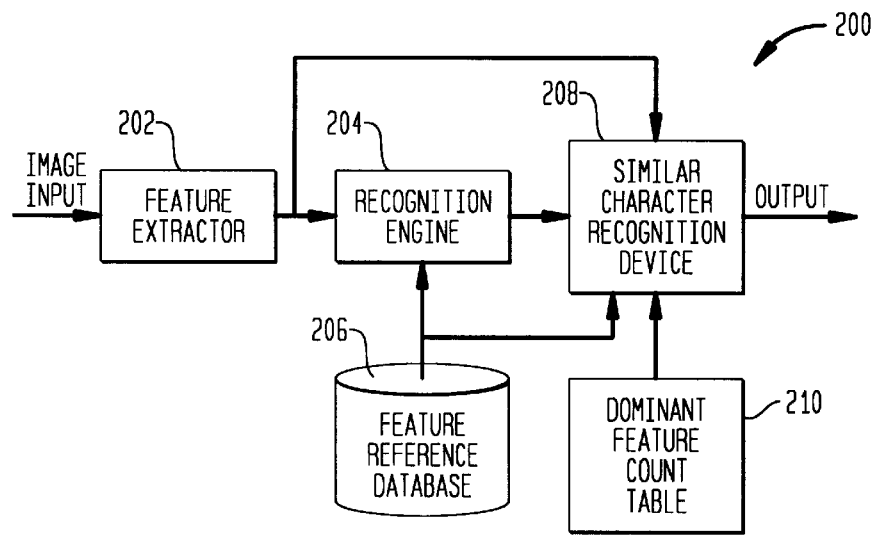
FIG. 5 is a block diagram of a statistical character recognition device having a similar-looking character recognizer according to the present invention.

FIG. 5 is a block diagram of a statistical character recognition device 200 including portions of an inventive similar-looking character recognizer used in the character recognition process. This device 200 may be located, for example, in the processor 54 of an OCR 50 or PDA 70. The device comprises a feature extractor 202, a recognition engine 204, a feature reference database 206, a similar character recognition device 208, and a similar-looking character dominant feature count table 210. Each of these components uses standard hardware well-known to those skilled in the relevant art.

The feature extractor 202, recognition engine 204, and feature reference database 206 may be conventional statistical character recognition components, and are not further described. The similar character recognition device 208 and the similar-looking character dominant feature count table 210 are described in detail below.

The device 200 according to the present invention has two relevant portions:

(1) the method and structures used to "train" the device (i.e, provide the statistical information against which images are compared) to distinguish similar-looking characters, and (2) the method and structures used to distinguish extracted images between similar-looking characters after the device has been trained.

Figure 6:
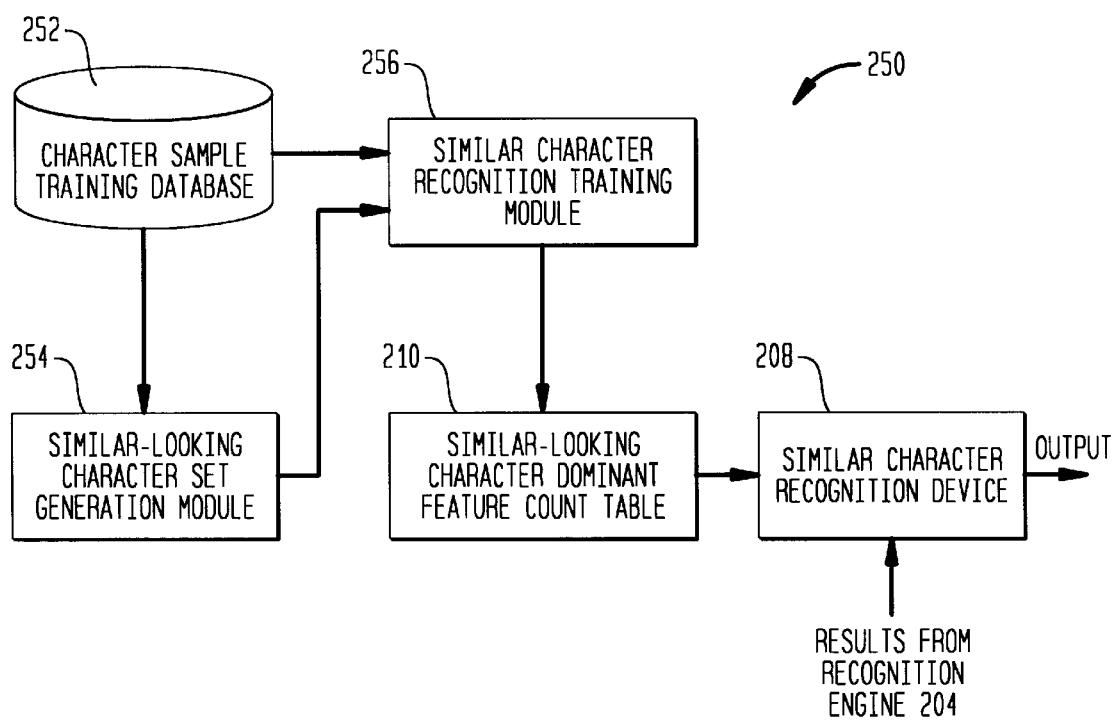
FIG. 6 is a block diagram of a similar-looking character recognizer according to an embodiment of the present invention.

FIG. 6 is a block diagram illustrating an architecture of the similar-looking character recognizer 250, including both the "training" and "recognizing" structures. The recognizer includes a character sample training database 252, a similar character set generation module 254, a similar character recognition training module 256, a similar character recognition device 208, and a similar-looking character dominant feature count table 210.

The character sample training database 252 is used by the conventional character recognition device to which the present invention may be associated. The database 252 contains information about a collection of various samples of commonly used characters. For example, it may be a database obtained from hundreds of different person's handwritten samples of the 5,401 commonly used Chinese language characters. As with any statistical-based device, the greater the number of samples used, the more reliable the statistics will be.

The similar character set generation module 254 determines which characters look so similar that they may lead to character recognition errors.

The similar character recognition training module 256 determines the most important features distinguishing the sets of similar-looking characters found by the generation module 254. The training module 256 uses information contained in the training database 252 to determine which features distinguish the characters, how important each of these features is in distinguishing the characters, and which features are unimportant or confusing and should not be used to distinguish the characters.

The count table 210 contains reference information used by the recognition device 208.

The recognition device 208 uses information in the count table to distinguish between similar-looking characters.

1. Training the Device a. The Similar Character Set Generation Module

In a character set, or vocabulary, containing a large number of characters, it is difficult to manually select all possible sets of similar-looking characters. Thus, it is preferable to automatically determine all sets of similar-looking characters. Also, characters that appear similar-looking to the human eye may not appear similar to a character recognition device and vice versa. The sets are determined by performing a statistical analysis on the characters in the character sample training database 252. The analysis determines which characters may result in erroneous recognition.

A preferred method for determining similar looking character pairs comprises the following steps:

1. using the sample training database 252, performing a test character recognition process;

2. recording possible erroneous outputs and the frequency that the errors occur for each pair of characters; and 3. if the frequency of confusion between a pair of characters meets a threshold level, the characters are considered to be similar-looking.

If the same set of characters are repeated, but with their orders reversed (i.e., A is erroneously recognized as B, and B is erroneously recognized as A), eliminate one set of confusing characters.

The lower the threshold, the more sets of similar-looking characters will be generated. In a currently preferred embodiment, the threshold is set at 2. It should be understood that this method may be used in any statistics-based system, and is not limited to similar-looking character recognition devices.

b. Similar Character Recognition Training Module

The similar character recognition training module 256 performs two functions. First, using the information in the sample training database 252, the module determines statistically distinguishing features between a set of similar-looking characters. This is called the "feature importance determination". Second, it determines which of these features are sufficiently different between the characters to distinguish them. This is called the "dominant feature determination". To conserve memory space, this is preferably done without extracting additional information or defining new features to be examined. Thus, character features that are unlikely to aid in distinguishing the similar-looking characters are filtered out and only important ones are considered in the similar character recognition.

i. Feature Importance Determination

As described above, statistics-based character recognition systems are "trained" using sample data in order to compile statistical data before it is able to perform character recognition on extracted images. The statistical information is obtained from the sample training database 252 and includes the mean value and standard deviation (or standard error) of the character features, in the blocks into which an image is partitioned. These statistics are used during the conventional character recognition process to determine which character the scanned image most closely resembles.

This same compiled statistical data may be used to distinguish two similar-looking characters. The statistical information of the similar-looking character set is compared to determine which features are statistically likely to be found in one character, but not the other. A preferred way to determine the importance of features is to determine the class separability of the various features between the similar-looking characters.

A person skilled in the art recognizes that there may be many methods for determining the class separability of the features. A currently preferred equation to determine the class separability between features of two characters x and y is:

$$\eta_{[x,y]}(i) = \frac{(m_{x,i} - m_{y,i})^2}{v_{x,i}^2 + v_{y,i}^2} \quad [\text{Eq. 1}]$$

where:

$\eta$ = the class separability of the ith feature of the set of similar-looking characters [x,y];

$m_{x,i}$ = the mean value of the ith feature of sample character x;

$m_{y,i}$ = the mean value of the ith feature of sample character y;

$v_{x,i}$ = the standard error of the ith feature of sample character x;

$v_{y,i}$ = the standard error of the ith feature of sample character y.

The larger the difference between the mean values of the ith feature of the x and y characters, the larger the numerator of the equation will be. The smaller the sum of the squares of the standard deviations between the ith feature of the x and y characters, the smaller the denominator of the equation. Thus, a high η value represents a statistically important difference between the characters.

ii. Dominant Feature Determination

The importance of the features may be established by ranking the features in order of their η values. Not all features, however, may be used to distinguish the characters. To the contrary, because the characters are similar-looking, many of the features are the same or similar and will tend to confuse the distinction between the characters. Thus, it is preferred to determine how many of the features should be compared to distinguish the characters, and which should be ignored during the comparison.

A preferred method of determining which features should be considered when distinguishing a similar-looking characters x and y (e.g., determining the dominant features), comprises:

1. Arrange each feature in order of importance (e.g., by descending η values);
2. Perform a test character recognition on the training samples of the xth and yth characters (reference data of other characters are not considered);
3. Define as zero an initial value of:
   (a) a first vector, counter vector $C=(c_1, c_2, c_3, \ldots, c_d)$; and
   (b) a second vector, $U=(u_1, u_2, u_3, \ldots, u_d)$;
4. During the test character recognition, record:
   (a) the accumulated difference ($d_k$, $1 \leq k \leq d$) of all features of sample characters x and y. A person skilled in the art recognizes that there may be many ways to determine the accumulated differences of the features. A currently preferred way to record this accumulated difference is by using the equation:

$$d_k = \sum_{i=1}^{k} [D(X_i, f_i) - D(Y_i, f_i)] \quad [\text{Eq. 2}]$$

where:

$f_i$=the ith feature value of the input sample character;

$D(X_i, f_i)$=the recognition system function for determining the distance between $f_i$ and templates of the ith feature of sample character x; and $D(Y_i, f_i)$=the recognition system function for determining the distance between $f_i$ and templates of the ith feature of sample character y.

The distance between $f_i$ and the ith feature of sample characters x and y may be determined by using a number of well known distance functions. Preferred distance functions for sample characters x and y are (respectively):

$$D(X_i, f_i) = \left[ 2\log(v_{x,i}) + \frac{(f_i - m_{x,i})^2}{v_{x,i}^2} \right] \quad [\text{Eq. 3}]$$

and $$D(Y_i, f_i) = \left[ 2\log(v_{y,i}) + \frac{(f_i - m_{y,i})^2}{v_{y,i}^2} \right] \quad [\text{Eq. 4}]$$

where:

$v_{x,i}$=the standard error of the ith feature of sample character x;

$v_{y,i}$=the standard error of the ith feature of sample character y;

$f_i$=the ith feature value of the sample character;

$m_{x,i}$=the mean value of the ith feature of sample character x; and $m_{y,i}$=the mean value of the ith feature of sample character y.

Using equations 3 and 4 in equation 2 results in:

$$d_k = \sum_{i=1}^{k} \left[ 2\log(v_{x,i}) + \frac{(f_i - m_{x,i})^2}{v_{x,i}^2} - 2\log(v_{y,i}) - \frac{(f_i - m_{y,i})^2}{v_{y,i}^2} \right] \quad [\text{Eq. 5}]$$

(b) for the kth feature for each sample of each character, increment $c_k$ of counter vector C if:
  i. the sample is a sample of character x and $d_k<0$;
  ii. the sample is a sample of character y and $d_k>0$; and
(c) For each training sample, increment the accumulate variable $u_k$ (k=1, 2, 3, . . . , d) of vector U as follows:

$$u_k = u_k + \alpha(d_k - d_{k-1})$$

where:

if the sample is a sample of character x, $\alpha=-1$; and if the sample is a sample of character y, $\alpha=1$.

5. When all of the samples of characters x and y are compared and the above three values are recorded, determine $u_k$, where:

$$u_k = \frac{u_k}{n_x + n_y} \quad [\text{Eq. 6}]$$

where:

$u_k$=the average distance between the characters x and y for that feature;

$n_x$=total number of samples of character x; and $n_y$=total number of samples of character y.

6. Determine the largest $c_k$ value. If more than one feature shares the largest $c_k$ value, select from these features the one having the largest $u_k$ value. Call the selected feature k*.

The feature k* is the last feature in the list of features (listed in order of importance) to be considered in distinguishing the similar-looking characters. The remaining features (features k*+1 to the end) are not considered because, statistically, they are not dominant enough to aid in the distinction between the characters.

The $d_k$ value represents the distance of $f_i$ from $m_{x,i}$ minus the distance of $f_i$ from $m_{y,i}$. If the result is negative, $f_i$ is closer to the feature of character x.

The variable $c_k$ is a counter for each feature k. The counter value represents the number of correctly recognized samples if all subsequent features (as ordered by importance) are ignored. The largest $c_k$ value defines the threshold between similar-looking and distinct features. It is likely that more than one feature may have the highest $c_k$, particularly when the number of sample characters is small (e.g., the number of handwriting samples in the character sample training database 252). Thus, the feature having the highest $c_k$ and $u_k$ values is selected. The $u_k$ value represents the average distance between the characters for that feature. The higher the $u_k$ value, the more distinct the feature.

c. Similar-Looking Character Dominant Feature Count Table

The similar-looking character recognition training module 256 determines the important and dominant features to compare to distinguish similar-looking characters. For this data to be useful during a character recognition process, it should be available to the similar character recognition device 208. Thus, the similar-looking character dominant feature count table 210 is created.

After the training procedure described above, the data stored in the count table 210 is:

1. a table of sets (pairs) of similar-looking characters; and
2. the number of dominant features (e.g., the k* value) to be considered.

Such a table is set out for two characters, identified here as character 1 and character 2:

| Character Identifier | Character Identifier of Similar-Looking Character | Number of Dominant Features |
|---|---|---|
| Character 1 | Character 2 | 15 |
| Character 1 | Character 8 | 14 |
| Character 1 | Character 15 | 16 |
| Character 2 | Character 3 | 28 |
| Character 2 | Character 6 | 50 |

Note that although characters 1 and 2 are similar-looking, the pair appears on the table only once (see The Character Set Generation Module description above).

To aid the similar character recognition device 208, the table may be represented by a number of linked lists, each list containing information regarding a single character. A linked list for Character 1 of the chart above is provided:

| Character Looking Similar to Character 1 | Number of Dominant Features |
|---|---|
| 2 | 15 |
| 8 | 14 |
| 15 | 16 |

A linked list for Character 2 of the chart above is provided:

| Character Looking Similar to Character 2 | Number of Dominant Features |
|---|---|
| 3 | 6 |
| 6 | 50 |

Because the features for the characters are sorted (during run time) in order of importance ($\eta$ value), the remaining task is to retrieve the number of dominant features for the characters. The linked lists improve the efficiency of this retrieval.

Figure 7:
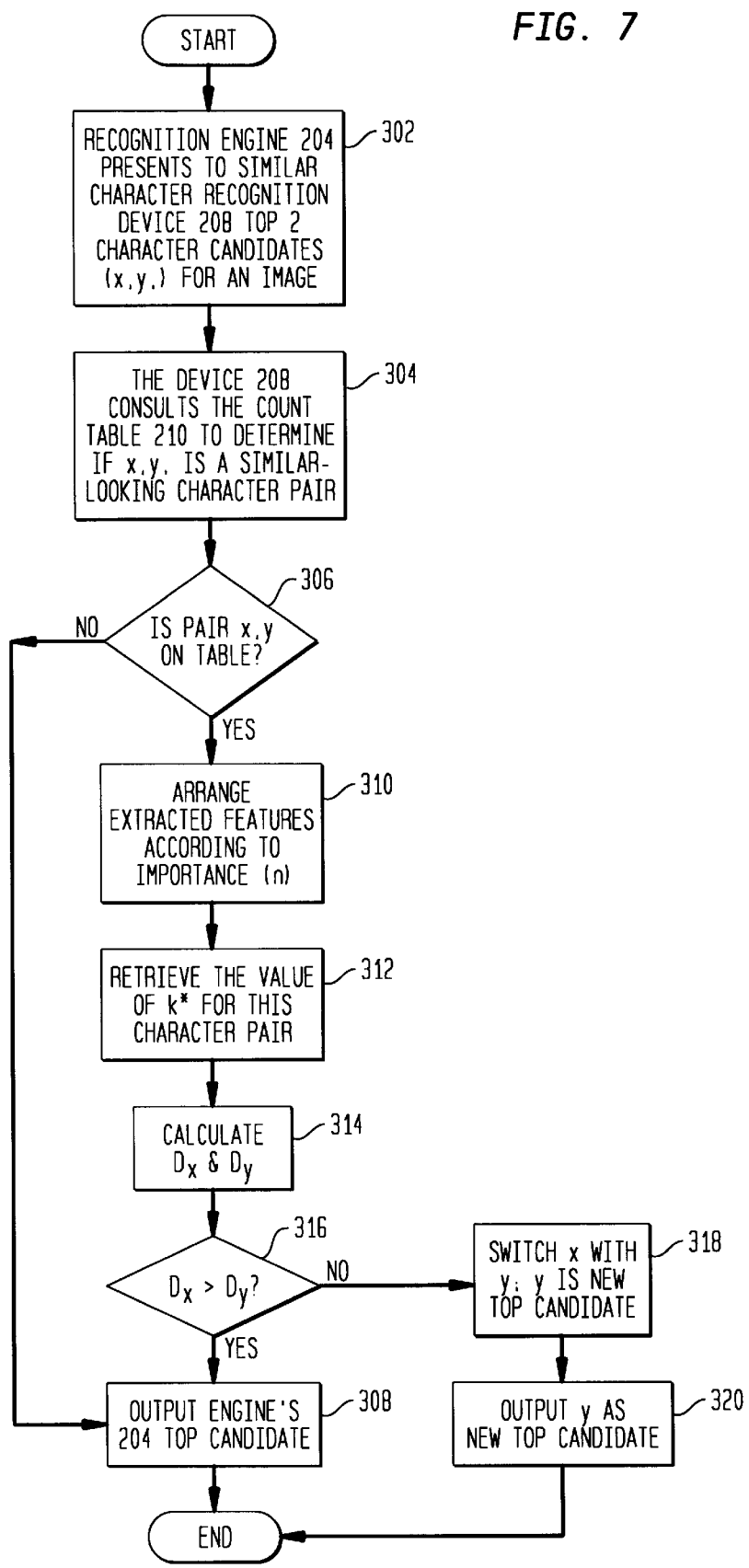
FIG. 7 is a flow chart of the operation of a similar character recognition device according to the present invention.

2. Recognizing Similar-Looking Characters a. Similar Character Recognition Device The similar character recognition device 208 uses the information stored in the similar-looking character dominant feature count table 210. FIG. 7 is a flow chart of the operation 300 of the similar character recognition device. As seen in FIG. 6, the conventional recognition engine 204 provides the similar character recognition device 208 with the top two candidate characters (characters x and y)(step 302) for an extracted image. The similar character recognition device 204 compares the top and second candidates for the extracted image with the entries in the similar-looking character dominant feature count table 210 (step 304). If there is no match (step 306), the similar looking character recognition device 208 outputs the top candidate for further processing (i.e., word or grammar checking) (step 308).

If the top two candidates do match a pair in the count table (step 306), the device 208 arranges the sequence of features extracted by the original feature extractor 92 according to importance (step 310). With the sequence arranged according to importance, the device 208 retrieves the number of dominant features (e.g., k*) from the count table (step 312). The device then re-calculates the distance between the obtained dominant features (step 314) of the extracted image to be recognized and the statistics compiled from the sample characters x and y to be $d_x$ and $d_y$, respectively, where $$d_x = \sum_{i=1}^{k*} \left[ 2\log(V_{x,i}) + \frac{(f_i - m_{x,i})^2}{v_{x,i}^2} \right];$$ [Eq. 7]

and $$d_y = \sum_{i=1}^{k*} \left[ 2\log(V_{y,i}) + \frac{(f_i - m_{y,i})^2}{v_{y,i}^2} \right]$$ [Eq. 8]

Once the difference between the character to be recognized (the extracted image) and the statistics of the samples is determined, if the extracted image has features closer to the top candidate (step 316), the top candidate is output as the character corresponding to the extracted feature. The top candidate is further processed (step 308) by the OCR 50, PDA 70, or other device. If the extracted image has features closer to the second candidate character (step 316), the candidate characters are switched (step 318) and the previously second candidate character becomes the new top candidate character. This new top character is output for further processing (step 320) by the OCR 50, PDA 70, or other device.

Note that the features extracted by the conventional recognition engine 204 are used and no new features are used in the determination. Therefore, no new reference bank of statistical information is used.

3. Exemplary Embodiment

The inventors have tested a similar-looking character recognizer 250 according to the present invention. The inventors used the assignee's proprietary handwritten character recognition system as a conventional character recognition system, which is a Bayes-based recognition system. About 100 different persons' handwriting samples of the 5,401 common Chinese characters were used to compile the statistical information in the character sample training database 252.

a. Training the Device

When generating similar character sets, the threshold was set at 2. That is, if the same two characters were mistaken for each other more than once, that pair of characters was added to the count table 210. The inventive device generated 8,665 pairs of similar-looking characters. Note that although a vocabulary of 5,401 characters was used, each character may be similar-looking to more than one other character, so the total number of similar-looking character pairs may exceed the total number of characters in the vocabulary, as happened here. FIG. 8 is a table 400 of one-hundred similar-looking Chinese language character pairs taken from the count table 210.

Figure 1:
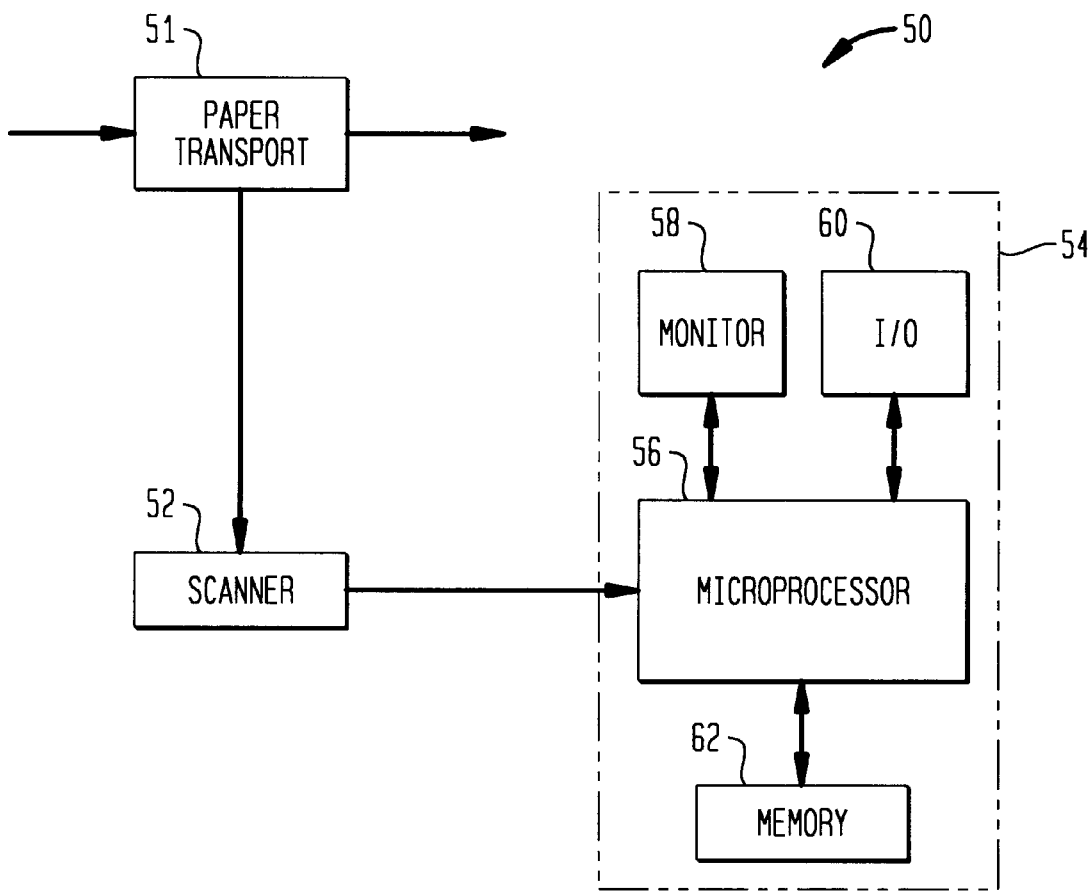
FIG. 1 is a block diagram of an OCR system.
Figure 2:
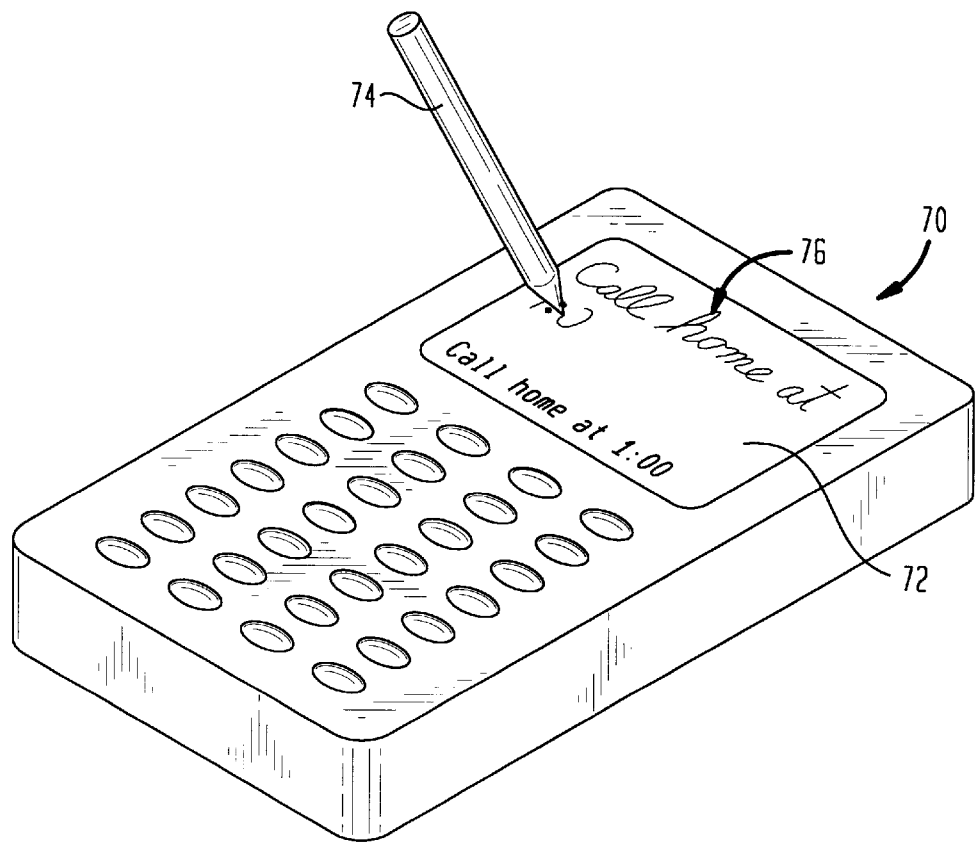
FIG. 2 is a perspective view of a personal digital assistant.
Figure 3:
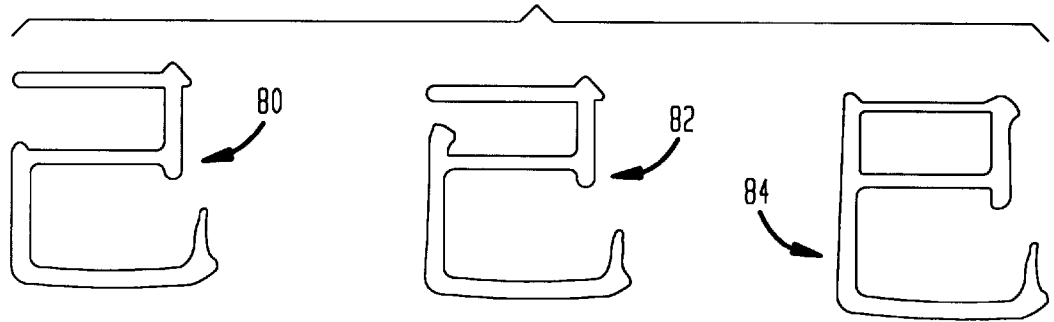
FIG. 3 illustrates three similar-looking Chinese language characters.
Figure 4:
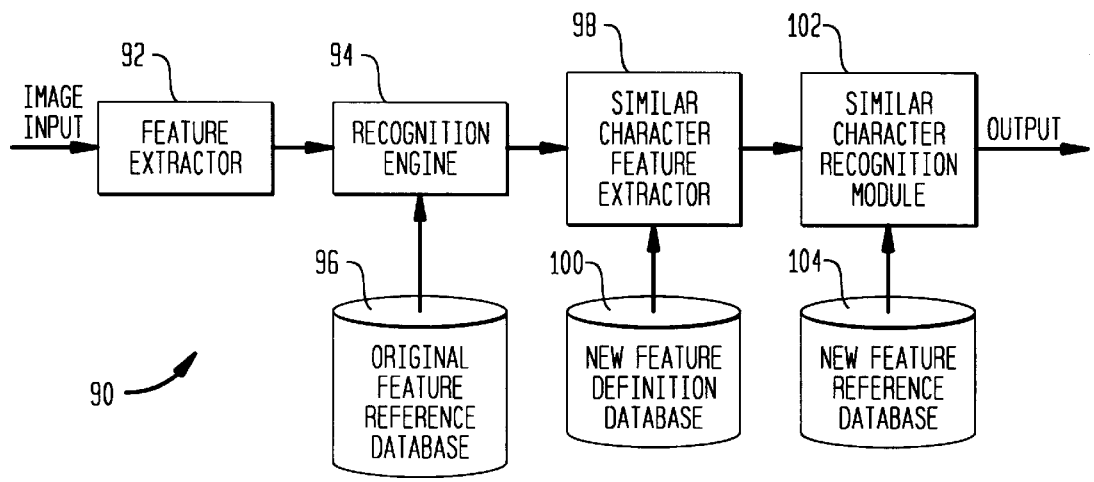
FIG. 4 is a block diagram of a conventional statistical character recognition device.
Figure 9:
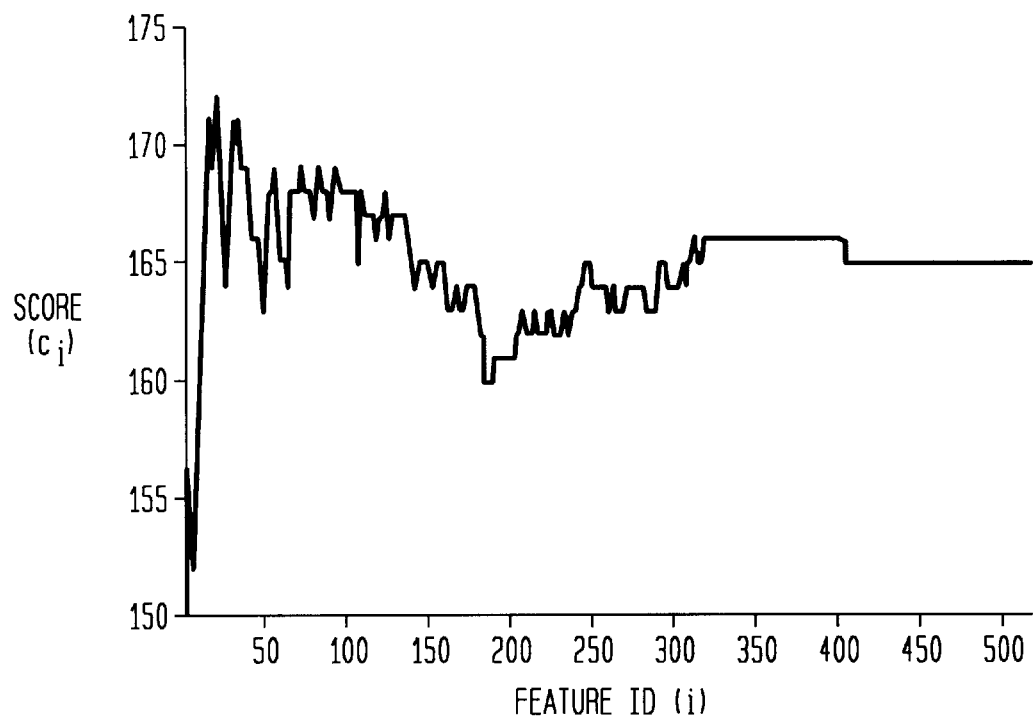
FIG. 9 is a graph of the results of a dominant feature analysis of the similar-looking character pair of the Chinese characters for "self" and "already", comparing the features with resulting $c_k$ values.
Figure 10:
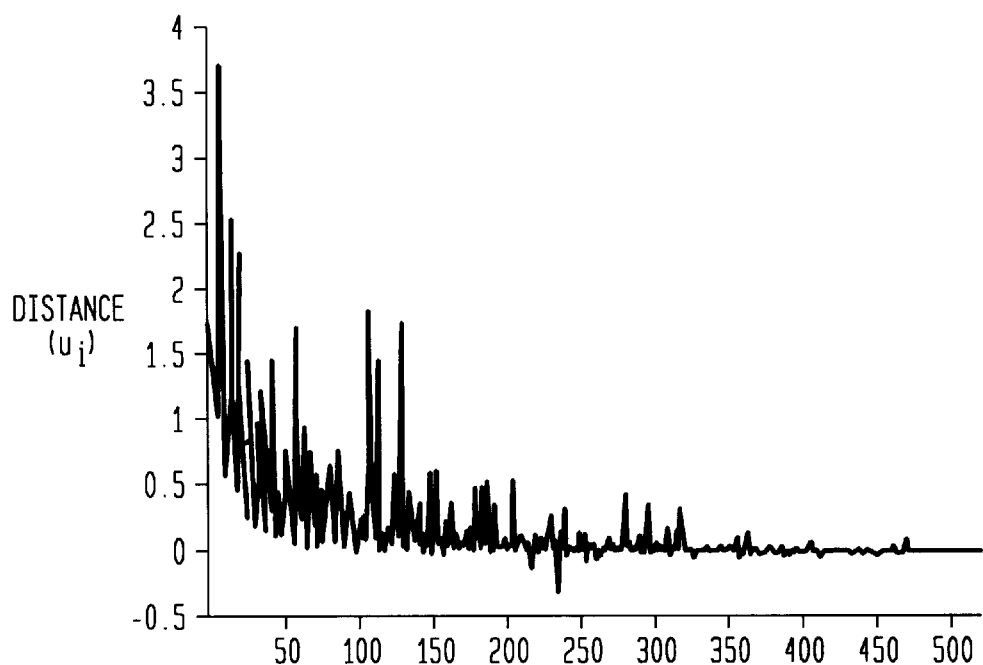
FIG. 10 is a graph of the results of a dominant feature analysis of the similar-looking character pair of the Chinese characters for "self" and "already", comparing the features with resulting $u_k$ values.

FIGS. 9 and 10 are graphs of the results of a dominant feature analysis of the similar-looking character pair of the Chinese characters for "self" 80 and "already" 82 (see FIG. 3). The character recognition engine 204 recognizes 520 features on each character. The horizontal axis of FIG. 9 is the feature identity code number (i.e., features 1 through 520 ranked by descending $\eta$ value) and the vertical axis is the $c_i$ value for each feature character obtained from training the two characters using the sample data. (Recall that $c_i$ represents the number of correctly recognized samples if all subsequent features are ignored.) The horizontal axis of FIG. 10 is the same as FIG. 9, the vertical axis is the $u_i$ value for the features resulting from training the two characters using the sample data. (Recall that $u_i$ represents the average distance between the characters for that feature.) The decreasing trend in the curve of FIG. 10 verifies that the η ranking works for practical data.

Figure 9A:
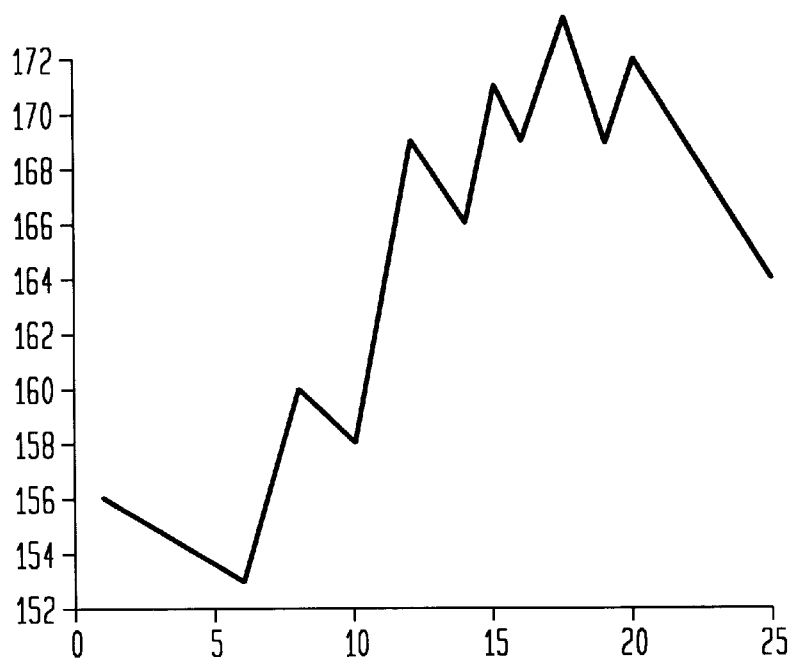
FIG. 9A is a graph of the first 25 features of FIG. 9.
Figure 10A:
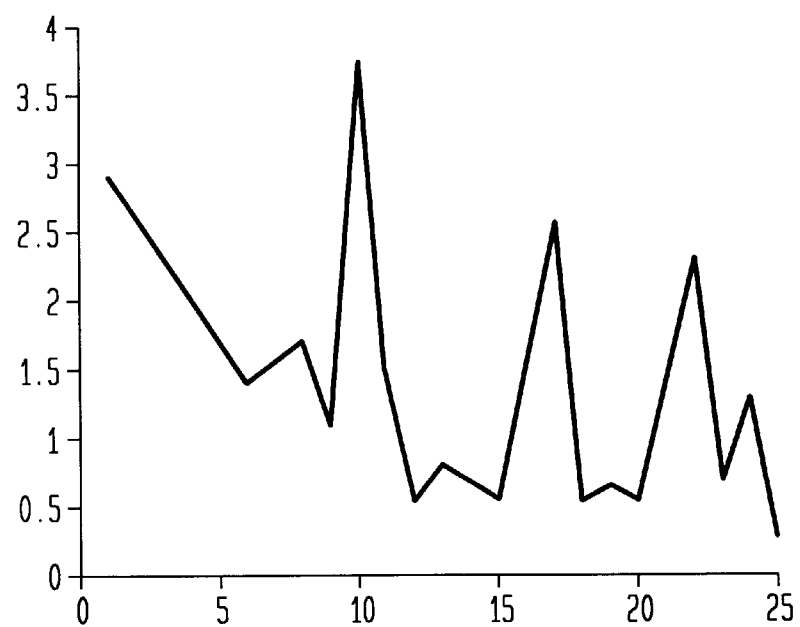
FIG. 10A is a graph of the first 25 features of FIG. 10.

FIG. 9A, which shows the values for the first 25 features of FIG. 9, shows the largest $c_i$ value occurs between features 17 and 18. FIG. 10A, which shows the values for the first 25 features of FIG. 10, shows that $u_{17}$=2.5749 and $u_{18}$=0.5556. Because $u_{17} > u_{18}$, the value of k (the number of dominant features) is selected to be 17. The total number of similar-looking training samples was 187. When the dominant features are used to distinguish similar-looking characters, 172 characters were correctly recognized (91.97%). When all 520 features were used to distinguish the similar looking characters, 165 characters were correctly recognized (88.23%). Using only dominant features, and not all features, increases the recognition rate 3.74%. Indeed, using many features tends toward an incorrect result. That is why the recognition rate is lower when all 520 features are used.

The count table 210 contains character identifiers for each character in a pair of similar-looking characters and the number of dominant features distinguishing one of the characters from the other in the pair. The features are ranked in order of importance, preferably in run time. The count table 210 is consulted to determine how many dominant features should be reviewed to distinguish this character. This table eliminates the need to constantly perform the dominant feature calculation. In this embodiment, each character identifier is represented by a two byte number and the number of dominant features is represented by one byte, the total storage space of this particular count table is 43,325 bytes ((2*2+1)*8,665). This is a modest storage requirement. The invention needs no other data storage space.

b. Similar-Looking Character Recognition With the Device

Once the count table 210 is established, the similar-looking character recognizer 250 may be used. To test the efficiency of the device, a second set of about 100 handwriting samples per character was used. The test results were:

1. The correct recognition rate of the character recognition system without the present invention was 90.20% overall;

2. The correct recognition rate of the character recognition system using the invention was 91.77% overall;

3. The percentage improvement in distinguishing similar-looking pairs using the present invention was 63.28%; and 4. The percentage of incorrectly identified characters by the present invention was 0.98%.

Testing indicated the greater number of similar-looking character sets stored in the count table, the greater the recognition rate improvement. Increasing the number of character pairs in the count table, however, increases memory space needed and slows processing time.

Thus, a similar-looking character recognition device for use with a statistical character recognition device is shown which increases the correct recognition of similar-looking characters without excessive data storage. The statistical data used by a conventional statistical character recognition device is used. A small table containing identifiers of character pairs and a number of dominant features is the only memory used by the present invention.

The above described embodiment of the invention is intended to be illustrative only. Numerous alternative embodiments may be devised by those skilled in the art without departing from the spirit and scope of the following claims.

We claim:

1. A statistical-based character recognition method for distinguishing between similar-looking characters, comprising the steps of:
   a. using training information, constructing a database of similar-looking character pairs;
   b. using the training information, for each pair in the database, selecting critical features distinguishing the similar-looking characters; and
   c. performing a character recognition process on an image using the selected critical features to distinguish between similar-looking characters;

wherein the step of constructing a database further comprises the steps of:
   a. performing a character recognition process using the training information;
   b. recording a frequency of erroneous recognitions of character pairs; and
   c. adding a character pair to the database if the pair is erroneously recognized at least a threshold number of times.

2. The method of claim 1 wherein the threshold number is 2.

3. A statistical-based character recognition method for distinguishing between similar-looking characters, comprising the steps of:
   a. using training information, constructing a database of similar-looking character pairs;
   b. using the training information, for each pair in the database, selecting critical features distinguishing the similar-looking characters by:
      i. determining an importance of each character feature in distinguishing the similar-looking character pair by determining a class separability of each feature; and
      ii. determining which character features are dominant; and
   c. performing a character recognition process on an image using the selected critical features to distinguish between similar-looking characters;

wherein the class separability of each feature is determined according to:

$$\eta_{[x,y]}(i) = \frac{(m_{x,i} - m_{y,i})^2}{v_{x,i}^2 + v_{y,i}^2}$$

where:
   η=class separability of an ith feature of a set of similar-looking characters [x,y];
   $m_{x,i}$=mean value of the ith feature of character x;
   $m_{y,i}$=mean value of the ith feature of character y;
   $v_{x,i}$=standard error of the ith feature of character x; and
   $v_{y,i}$=standard error of the ith feature of character y.

4. A statistical-based character recognition method for distinguishing between similar-looking characters, comprising the steps of:
   a. using a database of similar-looking character pairs, for each pair in the database, determining an importance of each character feature in distinguishing the similar-looking character pair;
   b. arranging each feature according to its importance;
   c. after arranging the features, setting a counter vector to zero;

d. performing a character recognition process on the similar-looking characters;
e. during the character recognition process:
   i. determining an accumulated difference between the features of the similar-looking characters; and
   ii. incrementing the counter vector when either the accumulated difference of a first character is less than 0 and the accumulated difference of a second character is greater than 0;
f. selecting the feature having the highest counter vector as a last dominant feature.

5. The method of claim 4, wherein the accumulated difference is determined according to:

$$d_k = \sum_{i=1}^{k} [D(X_i, f_i) - D(Y_i, f_i)]$$

where:

$f_i$=the ith feature value of the input sample character;

$D(X_i, f_i)$=the recognition system function for determining the distance between $f_i$ and templates of the ith feature of sample character x; and $D(Y_i, f_i)$=the recognition system function for determining the distance between $f_i$ and templates of the ith feature of sample character y.

6. The method of claim 4, wherein the step of determining the accumulated difference includes the step of determining according to:

$$d_k = \sum_{i=1}^{k} \left[ 2\log(v_{x,i}) + \frac{(f_i - m_{x,i})^2}{v_{x,i}^2} - 2\log(v_{y,i}) - \frac{(f_i - m_{y,i})^2}{v_{y,i}^2} \right]$$

where:

$f_i$=ith feature value of an input sample character;

$m_{x,i}$=mean value of the ith feature of a first character x;

$m_{y,i}$=mean value of the ith feature of a second character y;

$v_{x,i}$=standard error of the ith feature of character x;

$v_{y,i}$=standard error of the ith feature of character y.

7. The method of claim 4, further comprising performing a character recognition process on an image using the selected critical features to distinguish between similar looking characters.

8. The method of claim 4, further comprising the step of using training information, constructing the database of similar-looking characters.

9. The method of claim 8, wherein:
a. after arranging the features, setting a second vector to zero;
b. during the character recognition process, for each character, incrementing an accumulate variable $u_k$ of the second vector according to:

$$u_k = u_k + \alpha(d_k - d_{k-1})$$

where:

if the character is the first character, $\alpha = -1$; and
if the character is the second character, $\alpha = 1$;

c. after the character recognition process, determining a final accumulate variable $u_k$ according to:

$$u_k = \frac{u_k}{n_x + n_y}$$

where:

$u_k$=average distance between a first character x in the training information and a second character y in the training information for that feature;

$n_x$=total number of samples of character x; and $n_y$=total number of samples of character y; and d. if more than one feature share the highest counter vector, the step of selecting further comprises selecting the feature having the highest counter vector and $u_k$ as the last dominant feature.

10. A statistical-based character recognition method for distinguishing between similar-looking characters, comprising the steps of:
a. using training information, constructing a database of similar-looking character pairs;
b. using the training information, for each pair in the database, selecting critical features distinguishing the similar-looking characters; and
c. performing a character recognition process on an image using the selected critical features to distinguish between similar-looking characters;
wherein the step of performing a character recognition process on an image comprises the steps of:
a. receiving a top and a second candidate character;
b. determining if the top and second candidate characters are a similar-looking character pair;
c. if the top and second candidate characters are determined not to be a similar-looking character pair, outputting the top candidate as a recognized character corresponding to the image, otherwise:
   i. arranging features of the image according to importance;
   ii. retrieving a number of dominant features distinguishing the similar-looking character pair; and
   iii. determining if the dominant features of the image are closer to the top candidate than the second candidate, if so, outputting the top candidate as the recognized character corresponding to the image, otherwise outputting the second candidate as the recognized character corresponding to the image.

11. The method of claim 10, wherein before the step of determining if the dominant features of the image are closer to the top candidate than the second candidate, determining a distance between dominant features of the image and dominant features of the top and second candidates.

12. A statistical-based similar-looking character recognizer, comprising:
a. a character sample training database containing statistical information about sample characters;
b. a similar-looking character generation module configured to compile a list of similar-looking characters based on the data in the character sample training database;
c. a similar-looking character recognition training module configured to determine distinguishing features of similar-looking characters;
d. a similar-looking character dominant feature table containing the list of similar-looking characters and a list of the number of distinguishing features for each pair of similar-looking characters; and e. a similar-looking character recognition device responsive to the dominant feature table and configured to distinguish between similar-looking characters.

13. The statistical-based character recognition device of claim 12, wherein the similar-looking character dominant feature table is configured to store a linked list for information regarding a single character.

14. The statistical-based character recognition device of claim 13, wherein for each character the linked list includes entries for a similar looking character and a number of dominant features.

15. A method for distinguishing an image between similar-looking characters using a statistical-based character recognition system, the method comprising the steps of:

a. receiving first and second character candidates corresponding to the image;
   b. if the first and second characters are similar-looking characters, then:
      i. obtaining a number of dominant features;
      ii. determining an importance of each character feature in distinguishing the similar-looking character pair;
      iii. determining the difference between the image and the first and second candidates using an accumulated difference determined according to:

$$d_k = \sum_{i=1}^{k} [D(X_i, f_i) - D(Y_i, f_i)]$$

wherein the distance between $f_i$ and templates of the ith feature is determined according to:

$$D(X_i, f_i) = \left[ 2\log(v_{x,i}) + \frac{(f_i - m_{x,i})^2}{v_{x,i}^2} \right]$$

and $$D(Y_i, f_i) = \left[ 2\log(v_{y,i}) + \frac{(f_i - m_{y,i})^2}{v_{y,i}^2} \right]$$

where:

$v_{x,i}$=standard error of an ith feature of a first character x;

$v_{y,i}$=standard error of the ith feature of a second character y;

$f_i$=ith feature value of the character to be recognized;

$m_{x,i}$=mean value of the ith feature of character x; and $m_{y,i}$=mean value of the ith feature of character y.

16. A method for distinguishing an image between similar-looking characters using a statistical-based character recognition system, the method comprising the steps of:

a. receiving first and second character candidates corresponding to the image;
   b. if the first and second characters are similar-looking characters, then:
      i. obtaining a number of dominant features;
      ii. determining an importance of each character feature in distinguishing the similar-looking character pair;
      iii. determining the difference between the image and the first and second candidates using an accumulated difference determined according to:

wherein the accumulated difference is determined according to:

$$d_k = \sum_{i=1}^{k} \left[ 2\log(v_{x,i}) + \frac{(f_i - m_{x,i})^2}{v_{x,i}^2} - 2\log(v_{y,i}) - \frac{(f_i - m_{y,i})^2}{v_{y,i}^2} \right]$$

where:

$f_i$=ith feature value of an input sample character;

$m_{x,i}$=mean value of the ith feature of a first character x;

$m_{y,i}$=mean value of the ith feature of a second character y;

$v_{x,i}$=standard error of the ith feature of character x;

$v_{y,i}$=standard error of the ith feature of character y.

* * * * *